(No Model.)

E. C. FISHER.
STEAM COOKER.

No. 506,219.  Patented Oct. 10, 1893.

Witnesses:
J. B. McGirr.
A. L. Sohon.

Inventor.
Emma C. Fisher
by Frank L. Dyer
her Attorney

UNITED STATES PATENT OFFICE.

EMMA C. FISHER, OF CENTRE, WISCONSIN.

STEAM-COOKER.

SPECIFICATION forming part of Letters Patent No. 506,219, dated October 10, 1893.

Application filed December 16, 1892. Serial No. 455,333. (No model.)

*To all whom it may concern:*

Be it known that I, EMMA C. FISHER, a citizen of the United States, residing at Centre, in the county of Rock and State of Wisconsin, 5 have invented certain new and useful Improvements in Steam-Cookers; and I do hereby declare the following to be a full, clear, and exact description of the invention, which will enable others skilled in the art to which it appertains to make and use the same.

My invention relates to various new and useful improvements in steam cookers to be used for the purpose of cooking or steaming meats and vegetables.

The particular object of my invention is to provide a steam cooker which will be compact and portable in form and which will be capable of cooking or steaming a comparatively large quantity of food.

Another object of my invention is to provide means in connection with my improved steam cooker by which other culinary vessels on the stove may be kept hot for as long a time as may be desired.

For a better comprehension of my invention, attention is directed to the accompanying drawings, forming a part of this specification and in which—

Figure 1:
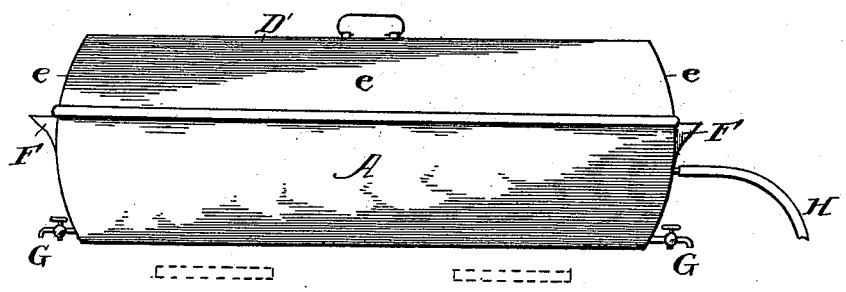
Figure 2:
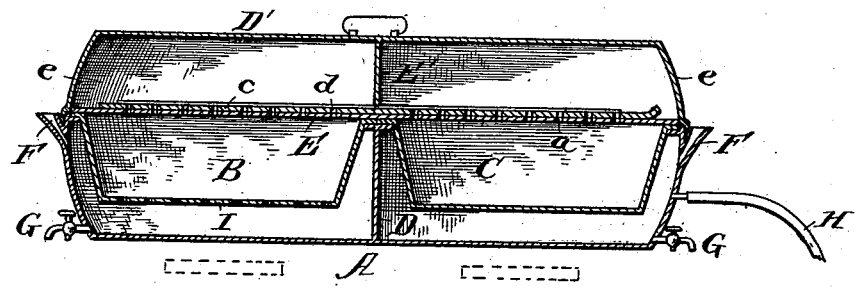
Figure 4:
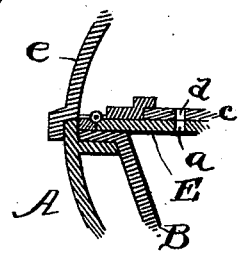
Figure 3:
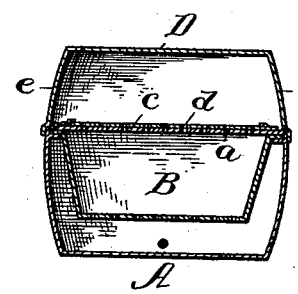

Figure 1 represents a side elevation of my improved steam cooker. Fig. 2 represents a longitudinal sectional view of the same, and Fig. 3 represents a cross-sectional view. Fig. 4 represents a detail view of a part of the device.

In all of the above views, corresponding parts are designated by the same letters of reference.

The main portion of my improved steam cooker consists of a large receptacle A, which is made of the general shape shown, of any desired sheet metal, such as tin, brass or iron. B is a steamer made of sheet metal, which is let down into the receptacle A, and C is a kettle which is also let down into said receptacle side by side with said steamer B. The said steamer A and kettle B are soldered or otherwise secured in place and occupy the entire length and breadth of the said receptacle A. D is a partition within said receptacle which separates said steamer A from said kettle B. E is a cover for the said receptacle which is hinged at one side as shown and which is adapted to cover both said steamer and said kettle. This cover is provided with openings $a$, thereon which will allow any steam from said steamer or said kettle to pass out through the cover. Mounted upon this cover in suitable guides $b$, is a slide $c$. The said slide $c$ is provided with openings $d$, corresponding in size and number with the openings $a$ in the cover E. When the openings $d$ in the slide are coincident with the openings $d$ in the cover, then the steam from the steamer and the kettle will be allowed to pass out through the same. By moving the slide to one side or the other the said openings $a$ and the openings $d$ will be thrown out of their coincident positions and no steam will be allowed to pass out through the cover E.

D' is a secondary cover which is made of sheet metal and which is provided with a deep flange $e$ which rests upon the cover outside of the receptacle A, as shown. The said flange $e$ is of a depth to allow sufficient space within said cover for the reception of any meats or vegetables which it is desired to cook upon the top of the cover. The said secondary cover D' is also provided with a suitable partition E' which divides the said receptacle into two parts so that food may be cooked on one side and be entirely independent of food cooked on the other side. F is a funnel opening into said receptacle A, at or near its upper end and against which the flange $e$ of the secondary cover rests. One of these funnels opens into said receptacle at one side of the partition D and the other funnel F opens into the receptacle at the other side of the partition D. Both of these sides of the said receptacle can be freed of water by means of a faucet G, placed near the bottom thereof. Passing out from one side of the said receptacle A near its upper end is a section of hose H' which may be introduced into any other culinary vessel upon the stove. This hose will convey the steam from out of the receptacle A into any other culinary vessel and any food which may be placed therein will be kept hot for as long a time as may be desired.

Within the bottom of the steamer B is a drip pan I of any suitable construction on which any meat may be placed which it is desired to cook.

My improved steamer or cooker is adapted for use either on gasoline, oil, or gas stoves, and, owing to its compactness and the fact that all heat will be evenly distributed therein it can be effectively used over a very small burner. But it will be understood that the invention may be used with any other stove on which it may be placed, similar to a wash boiler.

Having now described my invention, what I claim as new therein, and desire to secure by Letters Patent, is—

1. An improved steam cooker, consisting of the receptacle A, the steamer B and the kettle C supported within the same; the cover E for said receptacle and extending over said steamer B and kettle C and having perforations therein and the secondary cover D' above said receptacle A, substantially as described.

2. An improved steam cooker consisting of the receptacle A, the steamer B, and the kettle C supported within the same; the hinged cover E for said receptacle; and extending over said steamer B and kettle C and provided with openings $a$ therein; the slide $c$ mounted on said cover and provided with openings $d$ therein and the secondary cover D' for said receptacle, substantially as described.

3. An improved steam cooker consisting of the receptacle A, the steamer B and the kettle C supported within the same, the partition D dividing said receptacle into two parts, the cover E for said receptacle, extending over the said steamer and kettle and provided with openings $a$ therein, a funnel F opening into said receptacle A and faucets G opening out of said receptacle A, the secondary cover D' mounted above said receptacle and provided with a central partition D, substantially as described.

In testimony whereof I affix my signature in presence of two witnesses.

EMMA C. FISHER.

Witnesses:
A. L. FISHER,
M. M. PHELPS.